Oct. 30, 1923.

F. C. ATWOOD 1,472,380

CLAMP

Filed Jan. 24, 1921  2 Sheets-Sheet 1

Francis C. Atwood
INVENTOR.

BY Roberts, Roberts & Cushman
ATTORNEYS

Patented Oct. 30, 1923.

1,472,380

UNITED STATES PATENT OFFICE.

FRANCIS C. ATWOOD, OF NEWTON, MASSACHUSETTS, ASSIGNOR, BY MESNE ASSIGNMENTS, TO AMERICAN PROTEIN CORPORATION, OF BOSTON, MASSACHUSETTS, A CORPORATION OF MASSACHUSETTS.

CLAMP.

Application filed January 24, 1921. Serial No. 439,339.

*To all whom it may concern:*

Be it known that I, FRANCIS C. ATWOOD, a citizen of the United States, and resident of Newton, in the county of Middlesex and State of Massachusetts, have invented new and useful Improvements in Clamps, of which the following is a specification.

This invention relates to a clamp particularly designed for holding a cannula in an incision in the body of an animal while draining blood from the interior of the animal through the cannula.

In collecting blood from food animals at the time of slaughter, in condition suitable for human food or for therapeutic purposes, it is necessary to drain the blood from the interior of the body through a suitable tube or cannula in such manner that the blood will not come into contact with the exterior of the animal or with any other source of contamination outside of the body. The object of the present invention is to provide a novel and improved clamp for holding the cannula in place while the blood is flowing; and for preventing the blood from escaping through the incision outside of the cannula.

In the accompanying drawings which illustrate a preferred embodiment of the invention, Figure 1 is a plan view of the clamp in the plane of the clamping jaws;

Figure 1:
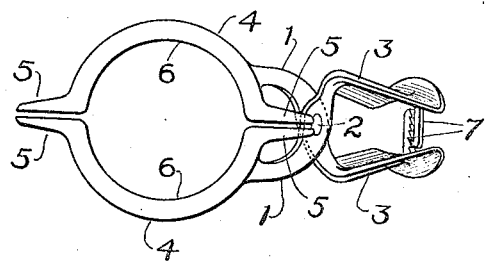
Figure 2:
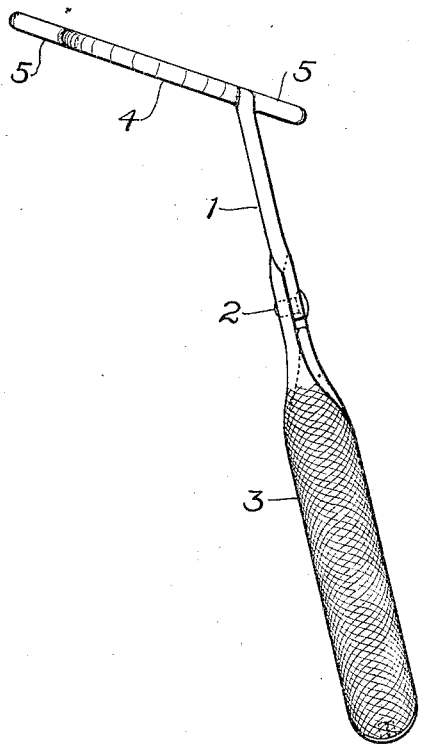
Figure 2 is a side elevation.
Figure 3:
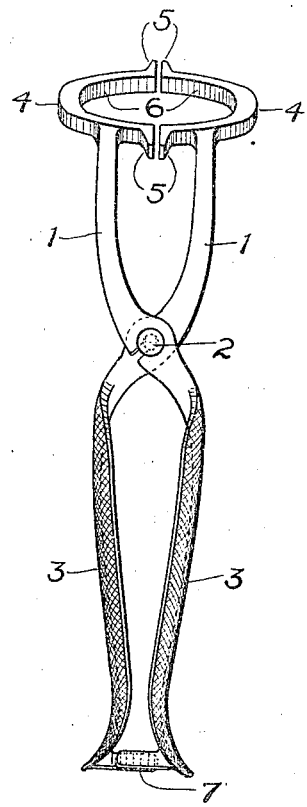
Figure 3 is an elevation viewed at right angles to Fig. 2.

The clamp comprises a pair of actuating levers 1, 1, pivoted to each other at 2, the lower ends of the levers being suitably shaped and knurled to form handles 3, 3. A pair of clamping jaws are mounted respectively at the ends of the levers, and are preferably disposed in a plane at an obtuse angle to the levers, in which relation they are in the most convenient position for use as hereinafter described. In its preferred form each jaw includes an outwardly curved middle part 4, and a straight part 5 extending from each end of the curved part. Thus the opposed surfaces of the jaws present concave faces 6, 6, at the middle part, and substantially parallel flat faces extending in both directions outward from the concave faces. The clamp may be locked in closed position by the toothed racks 7 on the ends of the handles 3, 3. When the handles are pressed together these toothed racks will automatically engage each other and hold the clamp closed. To release them the handles 3, 3, are sprung sufficiently to disengage the teeth, whereupon the clamp may be opened.

Figure 4:
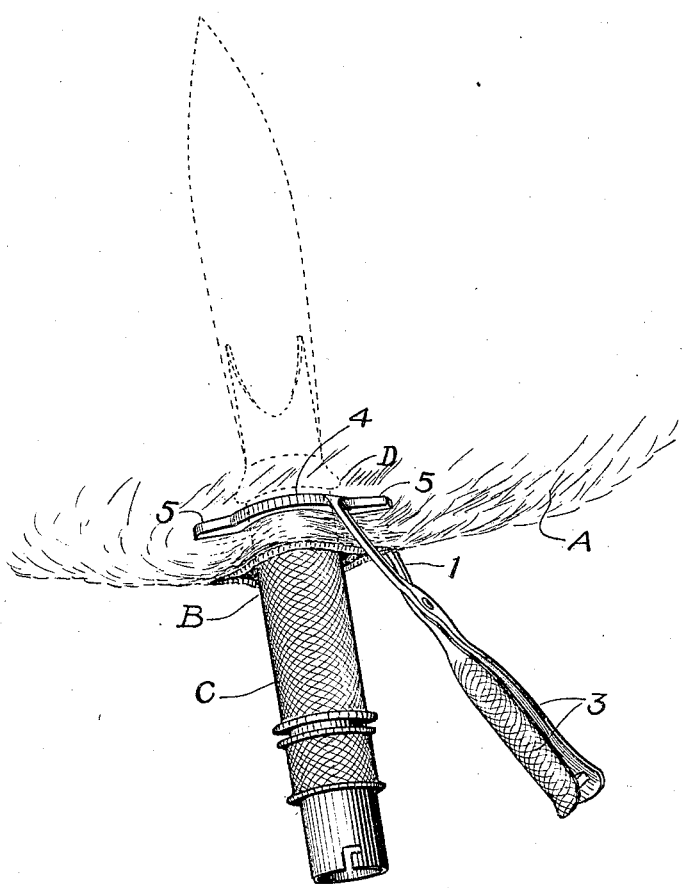
Figure 4 is a perspective view illustrating the instrument in use.

The operation of the device is illustrated in Fig. 4. Assuming that the end of a cannula C has been inserted in the body A of an animal through an incision B, the clamp is applied as shown and closed tightly together and there locked, with the concave faces of the clamping jaws embracing the cannula and clamping the lips or walls of the incision tightly around the cannula. This both holds the cannula firmly in position in the cut and prevents the flow of blood outside of the cannula past that part of the incision walls pressed against the cannula. At the same time the flat parallel faces of the jaws clamp together the walls of the incision where it extends at its ends in diametrically opposite directions away from the surface of the cannula, the incision B usually being substantially longer than the diameter of the cannula. Thus the flat parts of the jaws close the incision at each end and prevent the flow of blood through the ends of the incision.

The cannula may be of any desired form, but will preferably be provided with a shoulder D or some equivalent projection at its forward end to prevent it from accidentally being pulled out from between the clamping jaws. The cannula may be provided with a blade E for making the original incision, or for deepening a previously made incision and penetrating a large blood vessel, or both; or the cannula may be merely a tube to be inserted in an incision made with a separate knife. The clamp of the present invention is equally serviceable for use with either type of cannula.

I claim:

1. A clamp for holding a cannula in an incision in the body of an animal comprising a pair of relatively movable actuating levers, and a pair of clamping jaws having curved bearing surfaces for gripping the lips of an incision against the cannula mounted respectively on the ends of said levers and disposed at an angle thereto.

2. A clamp for holding a cannula in an incision in the body of an animal comprising a pair of relatively movable actuating levers, and a pair of clamping jaws having opposed concave faces adapted to embrace the cannula and to clamp the walls of the incision around the cannula, said jaws being mounted respectively on the ends of said levers and angularly disposed in relation thereto.

3. A clamp for holding a cannula in an incision in the body of an animal comprising a pair of relatively movable actuating levers, and a pair of clamping jaws having opposed concave faces and substantially parallel faces extending in both directions outward from the concave faces adapted to embrace the cannula and to clamp the walls of the incision together at each end where it extends beyond the sides of the cannula, and also to clamp the walls of the incision against the cannula, said jaws being mounted respectively on the ends of said levers and angularly disposed in relation thereto.

4. A clamp for holding a cannula in an incision in the body of an animal comprising a pair of relatively movable actuating levers, a pair of clamping jaws having curved bearing surfaces for gripping the lips of an incision against the cannula mounted respectively on the ends of said levers and disposed at an angle thereto, and means to lock said jaws in closed position.

5. A clamp for holding a cannula in an incision in the body of an animal comprising a pair of relatively movable actuating levers, a pair of clamping jaws having opposed concave faces adapted to embrace the cannula and to clamp the walls of the incision around the cannula, said jaws being mounted respectively on the ends of said levers and angularly disposed in relation thereto, and means to lock said jaws in closed position.

6. A clamp for holding a cannula in an incision in the body of an animal comprising a pair of relatively movable actuating levers, a pair of clamping jaws having opposed concave faces and substantially parallel faces extending in both directions outward from the concave faces, adapted to embrace the cannula and to clamp the walls of the incision together at each end where it extends beyond the sides of the cannula, and also to clamp the walls of the incision against the cannula, said jaws being mounted respectively on the ends of said levers and angularly disposed in relation thereto, and means to lock said jaws in closed position.

7. A clamp for holding a cannula in an incision in the body of an animal comprising a pair of relatively movable actuating levers, a pair of clamping jaws each comprising a curved part adapted to embrace the cannula, and a straight part extending from each end of the curved part adapted to clamp the walls of the incision together at each end where it extends beyond the sides of the cannula, said jaws being mounted respectively on the ends of said levers.

8. A clamp for holding a cannula in an incision in the body of an animal comprising a pair of relatively movable actuating levers, a pair of clamping jaws each comprising a curved part adapted to embrace the cannula, and a straight part extending from each end of the curved part adapted to clamp the walls of the incision together at each end where it extends beyond the sides of the cannula, said jaws being mounted respectively on the ends of said levers at an obtuse angle thereto.

9. A clamp for holding a cannula in an incision in the body of an animal comprising a pair of relatively movable actuating levers, a pair of clamping jaws each comprising a curved part adapted to embrace the cannula, and a straight part extending from each end of the curved part adapted to clamp the walls of the incision together at each end where it extends beyond the sides of the cannula, said jaws being mounted respectively on the ends of said levers, and means to lock said jaws in closed position.

Signed by me at Boston, Massachusetts, this twenty-first day of January 1921.

FRANCIS C. ATWOOD.